United States Patent
Schlossarczyk et al.

(10) Patent No.: US 6,910,550 B2
(45) Date of Patent: Jun. 28, 2005

(54) MUFFLER ARRANGEMENT FOR AN INTERNAL COMBUSTION ENGINE

(75) Inventors: Jörg Schlossarczyk, Winnenden (DE); Uwe Janoske, Michelfeld (DE); Johannes Menzel, Stuttgart (DE); Markus Keller, Leutenbach (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 10/251,866

(22) Filed: Sep. 23, 2002

(65) Prior Publication Data

US 2003/0057016 A1 Mar. 27, 2003

(30) Foreign Application Priority Data

Sep. 21, 2001 (DE) .......................................... 101 46 513

(51) Int. Cl.[7] .................................................. F01P 1/08
(52) U.S. Cl. ....................... 181/283; 181/219; 181/220; 181/225; 181/240; 60/317
(58) Field of Search .......................... 60/316, 317–321, 60/272; 181/219–225, 283, 272, 217, 262, 268, 269, 230, 231, 258, 282; 123/41.01, 41.49, 41.56, 41.65, 41.68; 417/372

(56) References Cited

U.S. PATENT DOCUMENTS

| | | | | |
|---|---|---|---|---|
| 4,332,220 A | * | 6/1982 | Itzrodt ........................ 123/41.7 |
| 4,370,855 A | * | 2/1983 | Tuggle ......................... 60/317 |
| 4,573,436 A | * | 3/1986 | Owens ..................... 123/41.18 |
| 4,867,270 A | * | 9/1989 | Wissmann et al. .......... 181/231 |
| 4,890,690 A | * | 1/1990 | Fischer et al. .............. 181/240 |
| 4,903,485 A | * | 2/1990 | Tamba et al. ................. 60/320 |
| 5,048,290 A | * | 9/1991 | Lavenius et al. ............. 60/299 |
| 5,199,389 A | * | 4/1993 | Wolf et al. ................. 123/41.7 |
| 5,533,869 A | * | 7/1996 | Garrison et al. ............ 417/234 |
| 5,738,184 A | * | 4/1998 | Masuda et al. ............. 181/262 |
| 5,857,327 A | * | 1/1999 | Sato et al. ..................... 60/302 |
| 5,902,971 A | * | 5/1999 | Sato et al. ................... 181/262 |
| 6,062,177 A | * | 5/2000 | Becker et al. .......... 123/65 BA |
| 6,164,066 A | * | 12/2000 | Sakaguchi et al. ............ 60/302 |

FOREIGN PATENT DOCUMENTS

DE 7925614 5/1980

* cited by examiner

*Primary Examiner*—David Martin
*Assistant Examiner*—Renata McCloud
(74) *Attorney, Agent, or Firm*—Walter Ottesen

(57) ABSTRACT

A muffler arrangement includes an exhaust-gas muffler, which is subdivided into an inlet space and an outlet space. An exhaust-gas stub of an internal combustion engine opens into the inlet space. Exhaust gas is conducted from the outlet space into an air channel via an exhaust-gas outlet. The air channel is formed between the housing of the exhaust-gas muffler and an outer cover and extends along a side of the exhaust-gas muffler. A cooling-air component flow is branched from a cooling-air flow of a cooling-air blower and enters at a first end of the air channel. The cooling-air component flow exits again at the second end of the air channel. In order to reduce the discharge temperature of the exhaust gas (especially with the arrangement of a catalytic converter), it is provided that the exhaust-gas jet is conducted in the air channel in spaced relationship to the air channel walls and is essentially surrounded on its path to the air channel outlet window by the supplied cooling-air component flow so that the exhaust-gas jet forms a core flow and the cooling-air component flow forms a cover flow surrounding the core flow.

58 Claims, 12 Drawing Sheets

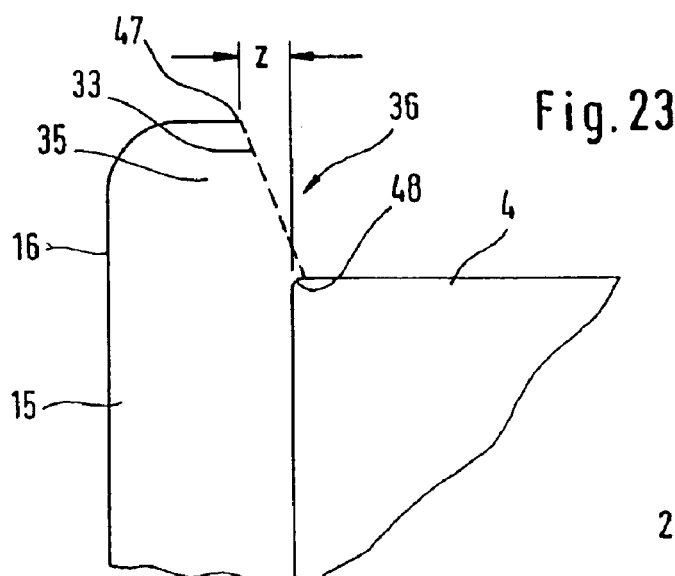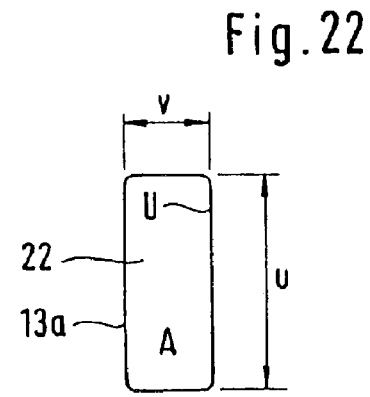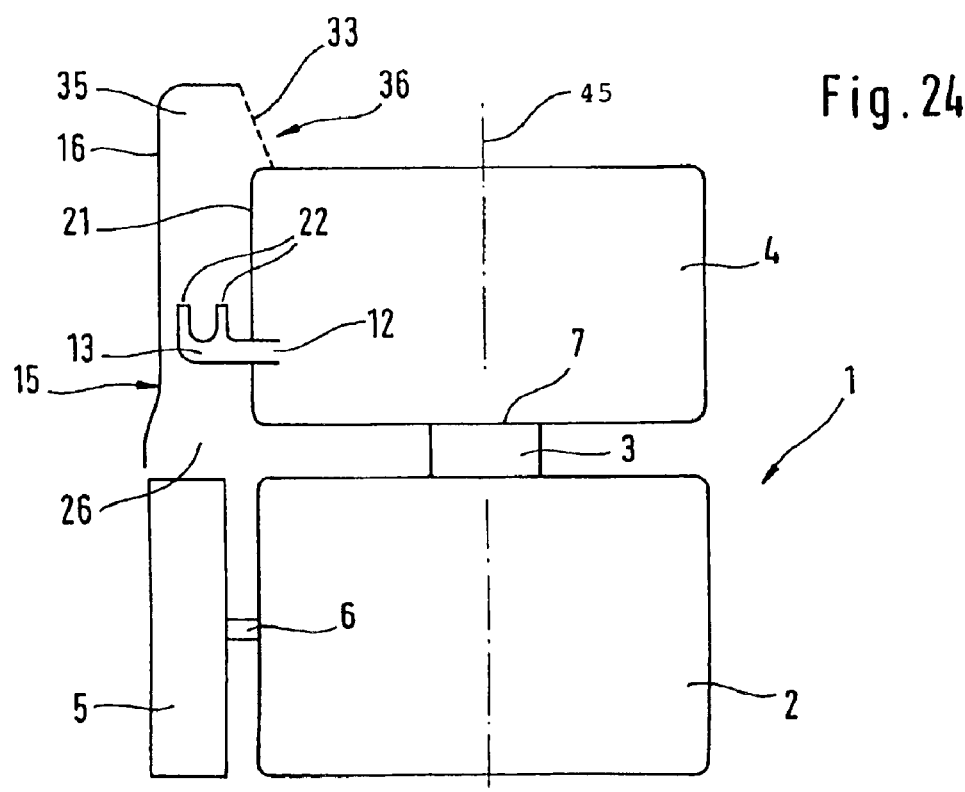

MUFFLER ARRANGEMENT FOR AN INTERNAL COMBUSTION ENGINE

FIELD OF THE INVENTION

The invention relates to a muffler arrangement for the internal combustion engine of a portable handheld work apparatus including a motor-driven chain saw, cutoff machine, brushcutter or the like.

BACKGROUND OF THE INVENTION

German patent publication 7,925,614 discloses a muffler arrangement wherein the exhaust-gas muffler includes an inlet space and an outlet space from which the exhaust gas is conducted away. The muffler housing is connected to an exhaust-gas stub of the cell next to the cylinder of the engine. The exhaust-gas outlet is mounted laterally on the muffler housing. In the region of the outlet, a branched-off cooling-air component flow is supplied to the exhaust-gas flow and this cooling-air component flow mixes with the exhaust gas at the outlet and provides a temperature reduction. It is a disadvantage in this type of configuration that the confluence of the cooling air component flow and of the exhaust-gas flow, which leaves the exhaust-gas muffler, takes place only in the region of the outlet from the apparatus housing and a significant reduction of the temperature level of the exhaust-gas flow cannot be achieved close to the apparatus housing.

SUMMARY OF THE INVENTION

It is an object of the invention to improve a muffler arrangement of the kind described above in such a manner that a marked temperature reduction is achieved in the discharge region of the exhaust gas on the apparatus housing.

The muffler arrangement of the invention is for an internal combustion engine of a portable handheld work apparatus. The muffler arrangement includes: the engine including a cylinder having an exhaust-gas stub through which exhaust gas is discharged during operation of the engine; the engine further including a cooling air blower for generating a cooling air flow; a muffler including a muffler housing partitioned into an inlet space and an outlet space; the muffler further including an exhaust-gas inlet opening into the inlet space and connected to the exhaust-gas stub adjacent the cylinder; the muffler further including an exhaust-gas outlet for conducting exhaust gas out of the outlet space; an outer cover mounted on the muffler housing and the outer cover and the muffler housing conjointly delimiting an air channel extending along a side of the muffler; the air channel having a first end for receiving a component of the cooling air flow and having a second end where the cooling air flow component exits; and, feed means for conducting a jet of the exhaust gas from the exhaust-gas outlet into the air channel so as to cause the jet of exhaust gas to flow at a spaced relationship to all sidewalls of the air channel and be surrounded by the cooling air flow component in such a manner that the jet is a core flow and the cooling air flow component is essentially a jacket flow surrounding the core flow.

What is decisive in bringing the cooling-air component flow and the exhaust-gas jet together is that the cooling-air component flow essentially completely surrounds the exhaust-gas jet, that is, that the cooling-air component flow can form a jacket-like cover flow surrounding the exhaust-gas flow. In this way, it is achieved that a full area contact of the cooling-air component flow to the hot exhaust-gas jet is provided in the region surrounding the exhaust-gas flow. An intensive heat exchange is achieved and the contact region between the exhaust-gas jet and the cooling air flow is thoroughly mixed in the transport along the air channel.

In order to provide a substantially uniform temperature level at the channel outlet window, the exhaust-gas muffler opens with more than one exhaust-gas outlet into the air channel. In this way, individual exhaust-gas jets are formed, which are surrounded by the cooling air, which is conducted in the air channel, as a cover flow, whereby a significant reduction of the temperature level results even along short flow distances. A guide plate or the like can be provided as a guide element in order to introduce the exhaust-gas jet into the air channel in a manner suitable for cooling. An outlet feed is mounted on the exhaust-gas outlet and projects into the air channel. The outflow direction of the outlet feed lies in the flow direction of the cooling-air component flow approximately in the longitudinal direction of the air channel. The outlet feed can extend essentially over the entire height of the air channel.

In a special embodiment of the invention, the feed window of the exhaust-gas feed has an essentially rectangular-shaped configuration. This configuration is so selected that the hydraulic diameter d of the feed window is less than 6.5 mm, preferably less than 5 mm. The hydraulic diameter d is determined in accordance with the formula $$d = \frac{A}{U};$$

wherein, A is the area of the feed window and U is the periphery of the feed window. Here, it is advantageous when the effective cross section in the region of the feed window is as large as possible, that is, the wall thickness of the outlet feed is configured to be minimal.

It has been shown to be advantageous for a good exhaust-gas temperature reduction when the total outlet area of all exhaust-gas outlets or feed windows lies in the region of approximately 1.3 $mm^2$ per 1 $cm^3$ stroke volume. The exhaust-gas outlets or feed windows open into the air channel. The total outlet area can be subdivided into one to six feed windows. Preferably, two feed windows are adequate and in individual cases, three feed windows are sufficient.

The cross section of the air channel in the outlet plane of the feed window is configured to be a multiple greater than the total outlet area of the feed window or of the exhaust-gas outlet into the air channel. Preferably, the cross section of the air channel in the outlet plane of the feed windows is approximately two to six times as large as the total exit area of all feed windows taken together. The cross section of the air channel can be so configured that the cross section of the air channel in the exit plane of the feed windows amounts approximately to four to twenty times the exit area A of a feed window. It is practical to configure the cross section approximately ten to fifteen times greater than the area of a feed window.

The air channel is widened toward its channel exit window in order to provide an excellent exhaust-gas guidance over the length of the air channel with a uniformly good formation of the cover flow of cooling air surrounding the exhaust-gas flow. The channel outlet window is then advantageously 1.5 to 4 times greater than the channel inlet window. The length of the air channel is matched such that it is greater than five times the hydraulic diameter and preferably amounts to approximately eight to twelve times the hydraulic diameter (d).

In a further embodiment of the invention, the air channel is arranged between the cylinder of the engine and the exhaust-gas muffler and extends transversely to the exhaust-gas stub from the one longitudinal side of the work apparatus to the other longitudinal side. The air channel has a considerable length in this way. Before exiting from the apparatus housing, an intensive thermal exchange between the cooling-air flow and the exhaust-gas jet is possible over the length of the air channel. A deflection of the mixture flow in advance of discharge from the air channel (that is, the apparatus housing) leads to a thorough mixing which ensures low temperatures of the discharging mixture flow close to the apparatus housing.

Preferably, the muffler housing is formed with a step which lies facing toward the cylinder and is overlapped for forming the air channel. This configuration makes possible a configuration of the air channel of considerable length in a small space for accommodating components. The total arrangement lies within the contour of a smoothly configured muffler housing. This makes possible a retrofit of already existing work apparatus with the muffler arrangement according to the invention.

The exhaust-gas outlet from the outlet space in the air channel can, as a practical matter, be provided in a side wall of the air channel or in the base thereof. The step is so configured that sufficient space for the arrangement of one or several outlets is provided.

BRIEF DESCRIPTION OF THE DRAWINGS

The invention will now be described with reference to the drawings wherein:

FIG. 22 is a view toward the feed window;

FIG. 23 is a detailed enlarged view of the air channel discharge window;

FIG. 24 is a schematic plan view of the cylinder with the exhaust-gas muffler and laterally mounted air channel; and, FIG. 25 is a view of the outflow end of a muffler according to another embodiment of the invention.

DESCRIPTION OF THE PREFERRED EMBODIMENTS OF THE INVENTION

The muffler arrangement is shown in the FIGS. 1 to 25 of the drawings in the various embodiments and views and is mounted on an air-cooled internal combustion engine such as a two-stroke engine or a mixture-lubricated four-stroke engine of a portable handheld work apparatus. These work apparatus include especially a portable handheld work apparatus such as motor-driven chain saw, a cutoff machine, a brushcutter, a blower apparatus or the like.

Figure 1:
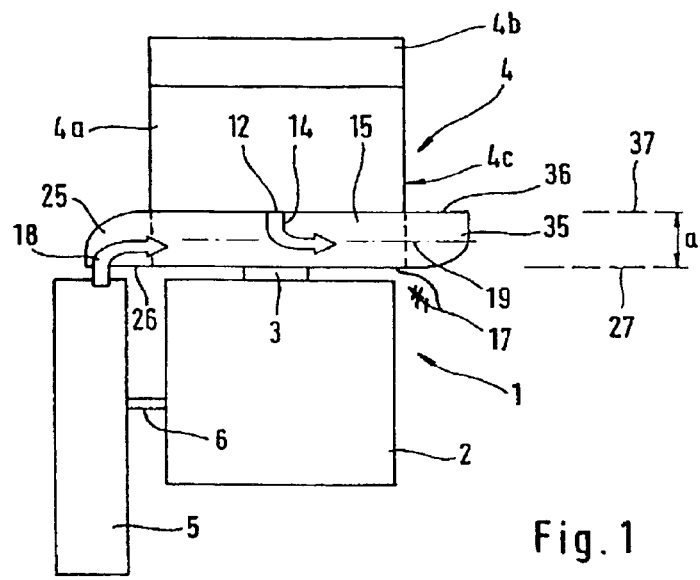
FIG. 1 is a schematic plan view of an internal combustion engine having a cooling-air blower and a muffler mounted thereon.

FIG. 1 is a schematic plan view of an internal combustion engine 1 having a cylinder 2, which is connected to an exhaust-gas muffler 4 via an exhaust-gas stub 3. The internal combustion engine 1 is air cooled and the necessary cooling air is made available by a cooling-air blower 5, which is mounted laterally on the engine 1 and is preferably driven by the crankshaft 6 thereof.

The exhaust-gas muffler 4 is assembled with two housing half shells (4a, 4b). The larger housing half shell 4a includes an exhaust-gas inlet 7, which is attached to the exhaust-gas stub 3 close to the engine 1 next to the cylinder 2.

The interior space of the exhaust-gas muffler 4 is subdivided, for example, by a partition wall 8, into an inlet space 9 and an outlet space 10. Advantageously, a catalytic converter 50 is mounted in the muffler housing 4 to treat the exhaust gas 11. The catalytic converter 50 is advantageously held in the partition wall 8 and establishes a flow connection between the inlet space 9 and the outlet space 10. It can be advantageous to provide a bypass in the partition wall 8 parallel to the catalytic converter 50.

Figures 2, 3:
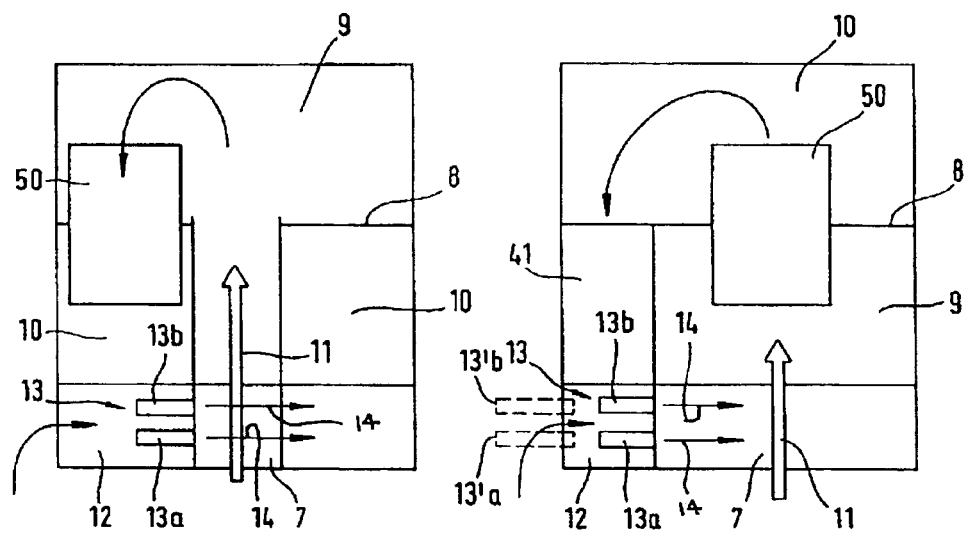
FIG. 2 is a schematic, in section, of an exhaust-gas muffler according to a first embodiment of the invention.
FIG. 3 is a schematic, in section, of an exhaust-gas muffler according to a second embodiment of the invention.

The exhaust-gas muffler 4 includes an exhaust-gas outlet 12 for conducting exhaust gas out of the exhaust-gas space 10 (see FIGS. 2 and 3). The exhaust-gas outlet 12 directs the exhaust-gas flow 14 via an arrangement 13 in component flows from outlet feeds (13a, 13b) as shown schematically in FIGS. 2 and 3. Here, it can be practical to configure the outlet feeds as feeds (13'a and 13'b) projecting from the muffler housing 4 in order to provide longer flow paths.

Figure 6:
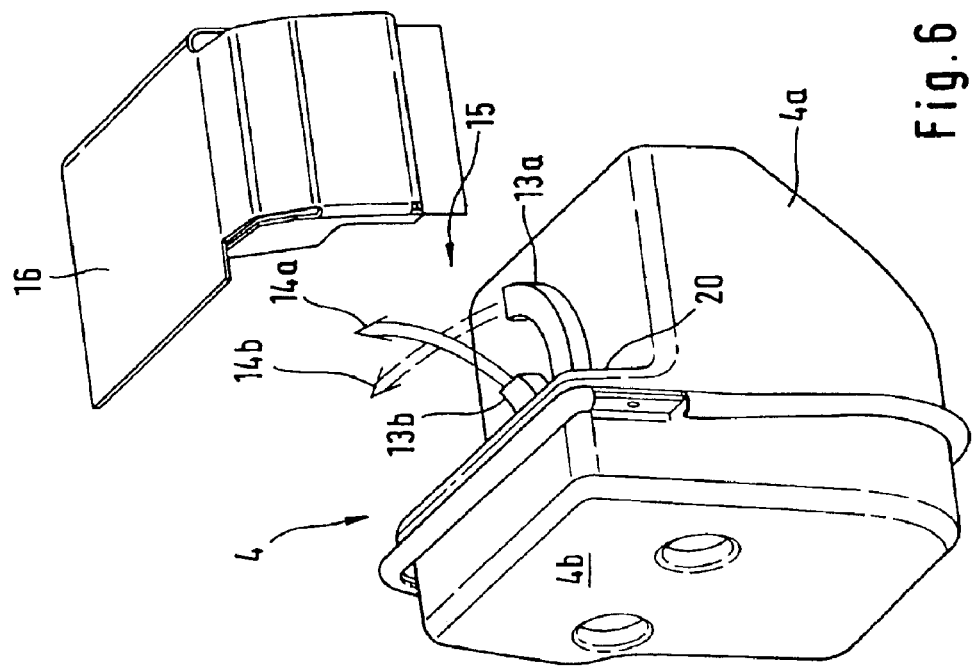
FIG. 6 is a schematic exploded view of an exhaust-gas muffler of the invention having two exhaust-gas outlets opening into the air channel.
Figure 5:
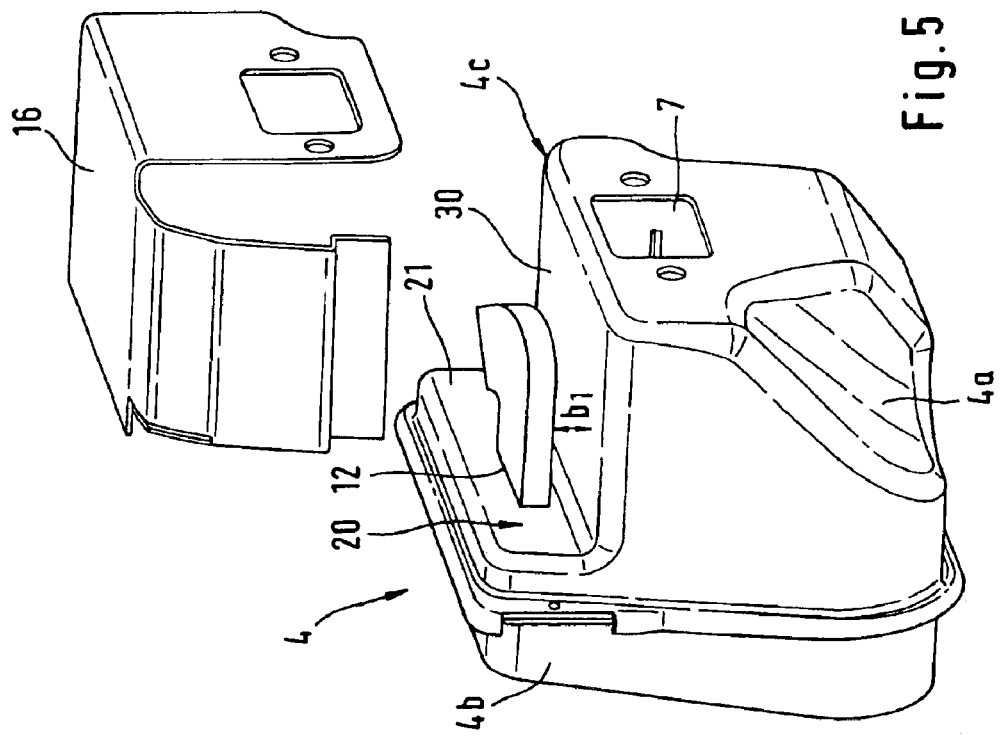
FIG. 5 is a perspective exploded view of an exhaust-gas muffler of the invention having a cover.

An outlet feed 13 opens into the air channel 15, which is delimited by the housing 4c of the exhaust-gas muffler 4 and an external cover 16 (see FIGS. 5 and 6). In one embodiment, the air channel 15 extends along a side 17 of the exhaust-gas muffler 4 facing toward the cylinder 2. The ends (25, 35) of the air channel 15 extend laterally over the outer contours of the muffler housing 4c. The air channel 15 lies approximately transversely to the exhaust-gas stub 3 of the cylinder 2 and essentially fills a space between the cylinder 2 of the engine 1 and the exhaust-gas muffler 4.

As shown in FIG. 24, the air channel 15 can also lie laterally next to the exhaust-gas muffler 4 approximately in a plane with the cooling-air blower 5. The air channel 15 extends approximately parallel to the engine longitudinal axis 45, which lies approximately in the direction of the out-flowing exhaust gases in the exhaust-gas stub 3.

The first end 25 of the air channel 15 lies, independently of its position, close to the cooling-air blower 5 and projects into the cooling-air flow generated by the cooling-air blower 5. The channel inlet window 26 lies on the longitudinal side of the air channel 15 facing toward the cylinder 2, while the channel outlet window 36 of the air channel 15, which is arranged on the second end 35, lies approximately in the longitudinal wall of the air channel 15 facing toward the exhaust-gas muffler 4. The windows 26 and 36 thus lie in different planes 27 and 37. The air channel 15 has a width (a) measured approximately in the longitudinal direction of the exhaust-gas stub 3. A cooling-air component flow 18 of the blower 5 enters, preferably under pressure, via the first end 25 of the air channel 15 projecting into the cooling-air flow and flows in the direction of the longitudinal center axis 19 of the air channel 15 to the channel outlet window 36 at the second end 35 of the air channel 15. It can be practical to configure the ends 25 and 35 to be arcuate in order to achieve a flow-favorable entry of the cooling-air component flow 18 as well as a flow-favorable exit.

On its path from the channel inlet window 26 to the channel outlet window 36, the cooling-air component flow 18 takes up the exhaust gas 14, which flows via an exhaust-gas outlet 12 into the air channel 15, and flows out from channel outlet window 36 together with the exhaust gas as a mixed flow. It can be practical to arrange interference bodies or the like at the channel outlet window 36, which cause the directed flow to become a diffused flow.

The exhaust-gas jet 14 enters essentially at lateral distances $b_1, b_2, b_3$ and $b_4$ (see FIGS. 4 and 5) to the air channel walls into the air channel 15 and is essentially surrounded by the cooling-air component flow 18 supplied advantageously under pressure. As shown schematically in FIG. 4, the exhaust-gas jet 14, which discharges from the outlet feed 13, forms a core flow and the cooling-air component flow 18 forms a cover or annular flow substantially surrounding the core flow. In this way, an excessive heating of the air-channel walls is countered, on the one hand, and a larger contact region between the exhaust-gas flow and the cooling-air component flow is achieved on the other hand. This contact region is configured as an almost closed sleeve about the core flow and makes a large heat transfer possible between the exhaust-gas flow and the cooling-air component flow. In the contact region, components of the cooling-air component flow and the exhaust-gas flow mix, which likewise contributes to the reduction of the discharge temperature of the mixed flow at the channel outlet window 36.

The muffler housing 4c has a step 20 facing toward the cylinder 2 to form the air channel 15 (see FIG. 5). The step 20 is configured essentially in the housing shell 4a fixed on the exhaust-gas stub 3. The step 20 lies within the outer contour of the outer housing half shell 4b of the muffler housing 4c so that the space occupied by the exhaust-gas muffler is not significantly greater because of the configuration of the air channel 15 and the mounted cover 16. The cover 16 extends over the step 20 and forms component walls of the air channel 15 whose other component walls are formed by the step 20 of the larger housing half shell 4a.

According to FIG. 5, the exhaust-gas discharge 12 is configured in a side wall 21 of the air channel lying transversely to the exhaust-gas stub 3. The exhaust-gas discharge 12 lies close to the first end 25 of the air channel 15.

Figure 4:
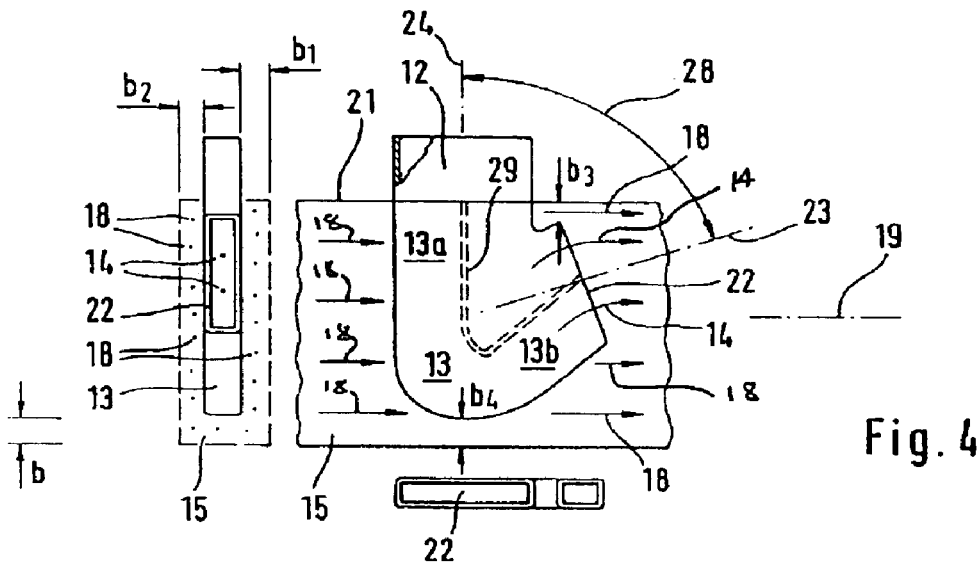
FIG. 4 is a schematic of the configuration of an outlet feed in the air channel.

As shown in FIG. 4, the exhaust-gas discharge 12 is provided with a flat-channel discharge feed 13, which extends into the air channel over a first component section 13a transversely to the longitudinal center axis 19 of the air channel and has a second discharge section 13b lying at an angle to the first section 13a. The discharge section 13b includes a feed window 22, which lies in a plane transversely to the longitudinal center axis 19 of the air channel 15.

A center perpendicular 23 is erected on the plane of the feed window 22 and defines an angle 28 with the longitudinal center axis 24 of the first section 13a of the pipe-shaped feed 13. This angle 28 is less than 90°. In the embodiment shown, the angle is preferably 70°.

It can be practical to provide a center wall 29 in the flat-channel section, whereby the exhaust-gas flow 14 is subdivided into component flows. The outflow direction of the exhaust-gas flow 14 from the feed window 22 is directed in a direction toward the longitudinal wall 21. The simultaneously flowing cooling-air component flow 18 steers the exhaust-gas flow in the direction of the longitudinal center axis 19 so that the cover of the exhaust-gas flow 14 by the cooling-air component flow 18 is ensured. The exhaust-gas flow 14 is comprised of one or several component flows.

Figure 7:
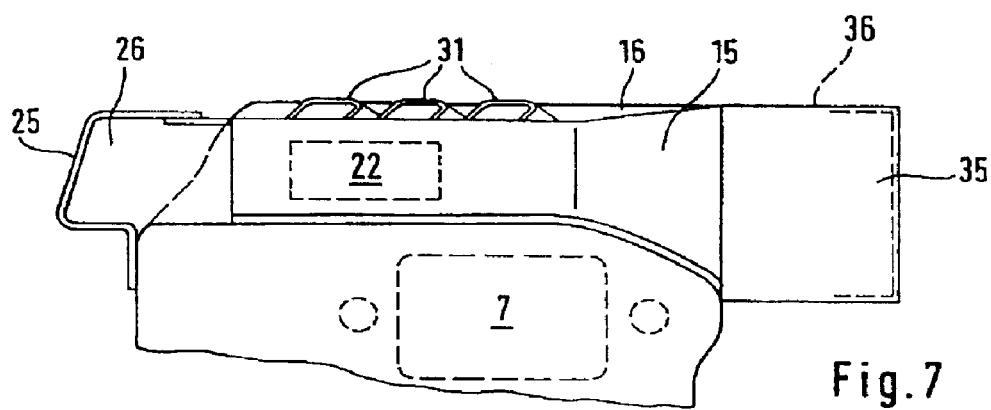
FIG. 7 is a detail view of the air channel as seen from the cylinder side.
Figure 8:
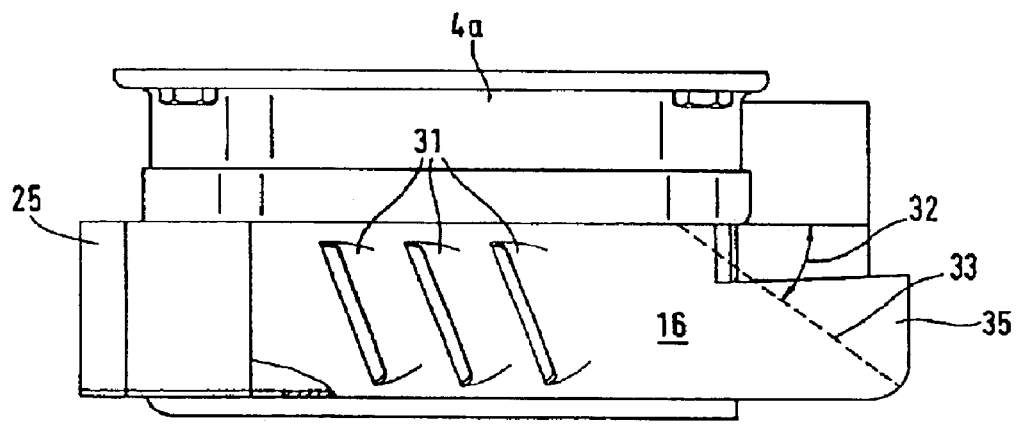
FIG. 8 is a schematic, in plan, of the air channel of FIG. 7.

The flat-channel outlet feed 13 is at a distance $b_1$ from the base 30 and is at a distance $b_2$ from the cover 16 and the feed window 22 is at distances ($b_3, b_4$) from the air channel side walls 21 as shown in FIG. 4. For this reason, the exhaust-gas flow 14 exits as a core flow into the cooling-air component flow 18 forming a cover flow. It can be advantageous to provide input air scoops 31 for supplementing the supply of cooling air into the cover 16 as shown in FIGS. 7 and 8. From these views, it can be seen that the cooling-air inlet window 26 has a smaller flow cross section than the outlet window 36 of the air channel 15. For this purpose, the cover 16 is extended downwardly in the region of the end 35, which extends over the contour of the muffler housing 4c, so that a head is formed which is enlarged in the side view as shown in FIG. 7. It is practical to provide a protective spark catcher 33 at an angle 32 of approximately 45° in the second end 35 of the air channel 15, which functions to prevent flying sparks.

For example, as shown in FIG. 6, the outlet space can open into the air channel 15 via more than one exhaust-gas outlet in accordance with a further embodiment of the invention. In FIG. 6, two exhaust-gas outlets are provided from which respective outlet feeds (13a, 13b) extend into the air channel 15. The outlet feed 13a is aligned with its end section approximately in the longitudinal direction of the air channel 15; whereas, the outlet feed 13b projects approximately transversely into the air channel 15 at an angle of approximately 45°. The exhaust-gas component flow, which exits from the outlet feeds 13a and 13b, is taken along by the cooling-air component flow flowing through the air channel 15 and is conducted in such a manner that the cooling-air component flow forms respective cover flows for the two exhaust-gas component flows exiting from the outlet feeds 13a and 13b. Here, it can be practical that the exhaust-gas jets (14a, 14b), which exit from the exhaust-gas outlet feeds 13a and 13b, cross each other in the space. The exhaust-gas outlet feeds 13a and 13b advantageously open into the air channel 15 at different planes, that is, the exhaust-gas jets 14a and 14b do not disturb each other.

Figure 10:
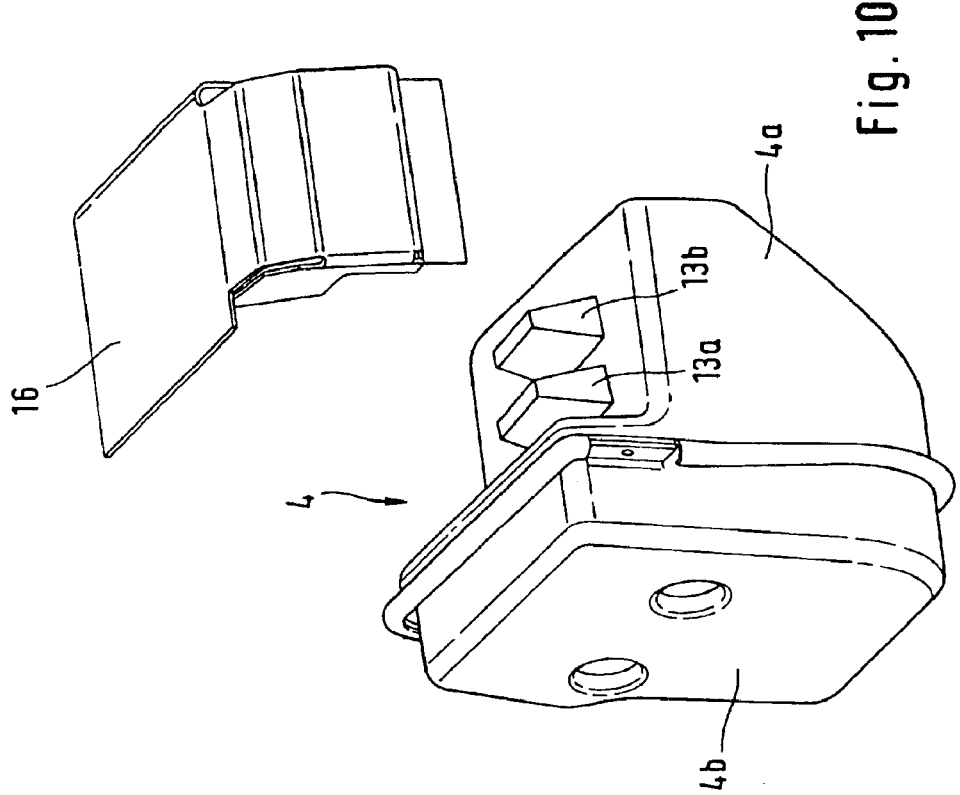
FIG. 10 is a rotated perspective of the exhaust-gas muffler shown in FIG. 9.
Figure 9:
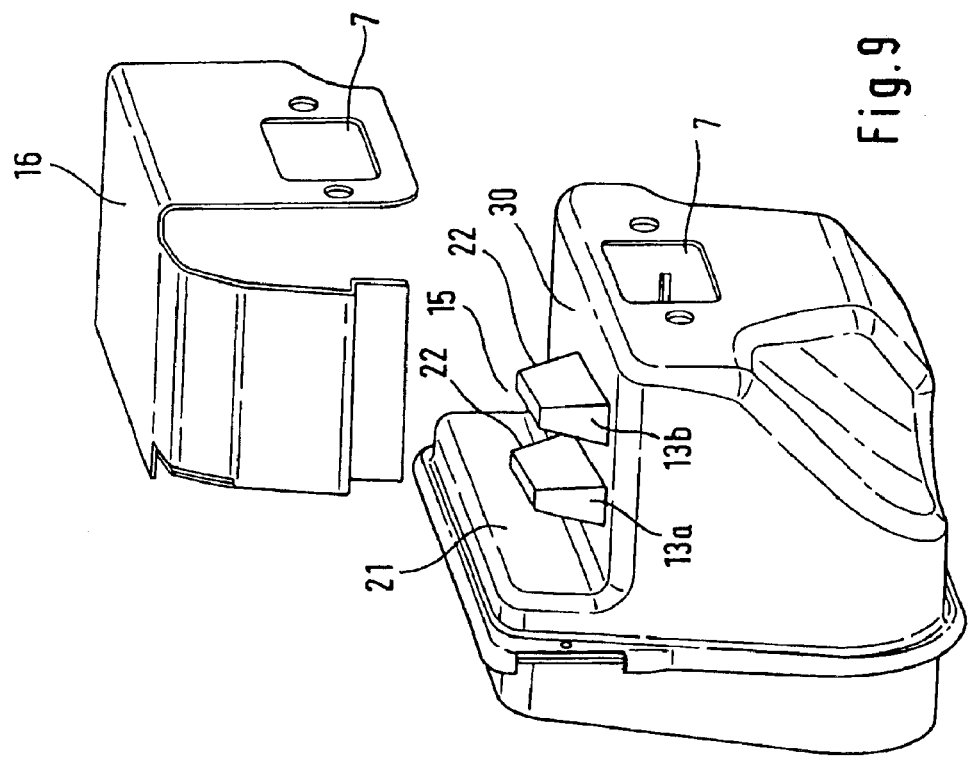
FIG. 9 is an exploded schematic showing an exhaust-gas muffler having two trapezoidally-shaped outlet feeds.

The embodiment of FIGS. 9 and 10 corresponds to the basic configuration shown in FIGS. 5 and 6 and, for this reason, the same reference numerals are used. As a departure, the exhaust-gas discharge is now provided in the base 30 of the air channel 15. The outlet feeds 13a and 13b have a trapezoidally-shaped configuration and are aligned approximately in the longitudinal direction of the air channel 15. The respective outlet feed windows 22 lie facing away from the first end 25 of the air channel 15 so that the cooling-air flow first flows about the outlet feeds 13a and 13b and takes up the exiting exhaust-gas flows at the elevation of the outlet feed windows 22.

Figure 11:
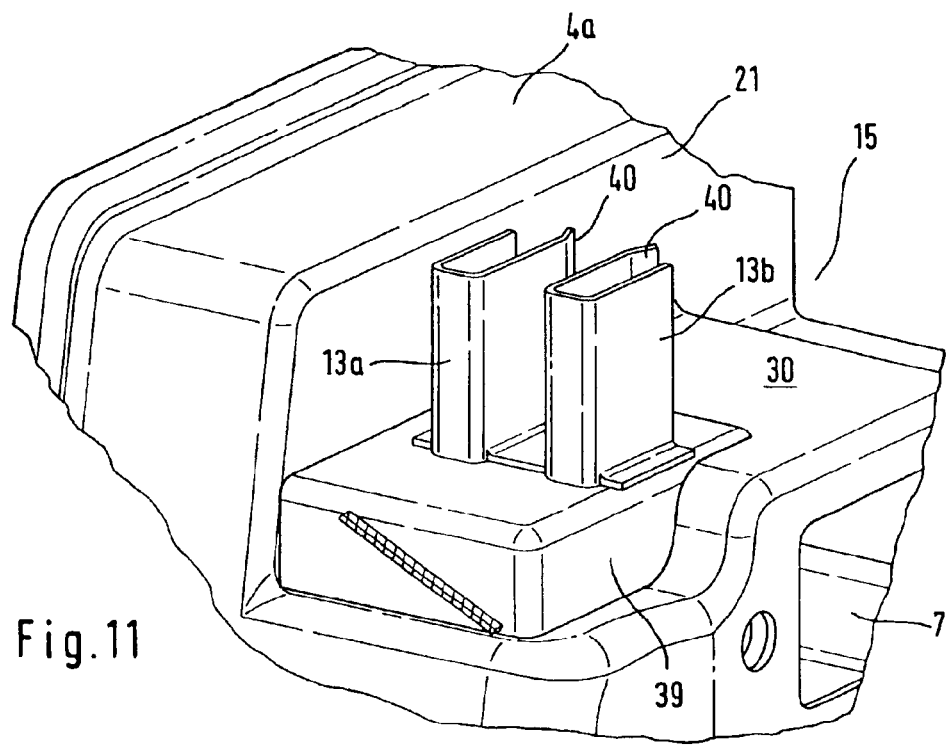
FIG. 11 is a detail view of an exhaust-gas muffler having two rectangularly-shaped outlet feeds in the region of the cooling air inlet.
Figure 12:
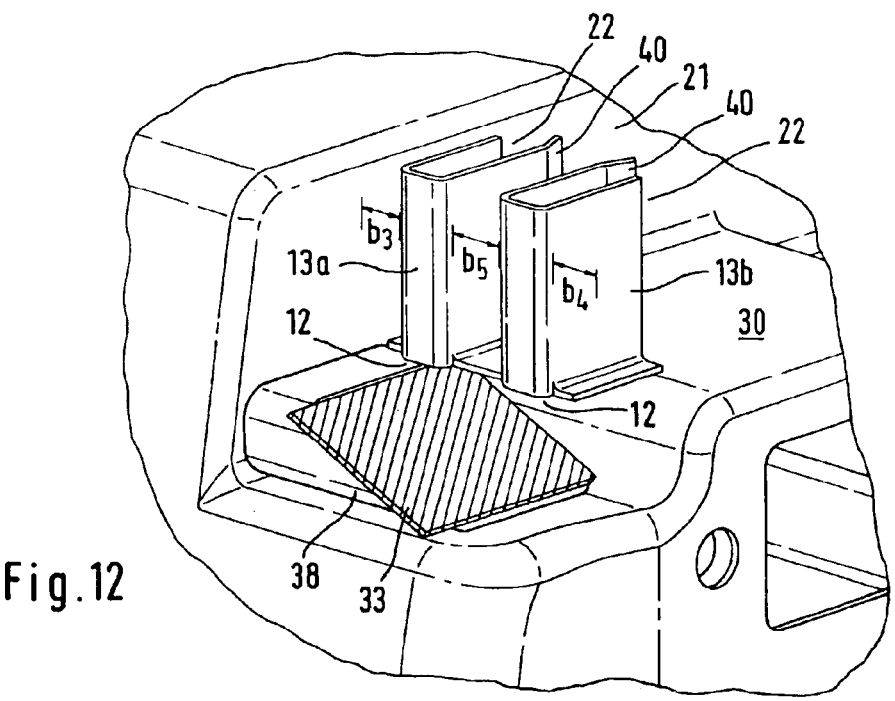
FIG. 12 is an expanded view according to FIG. 11 with an opened exhaust-gas discharge.
Figure 13:
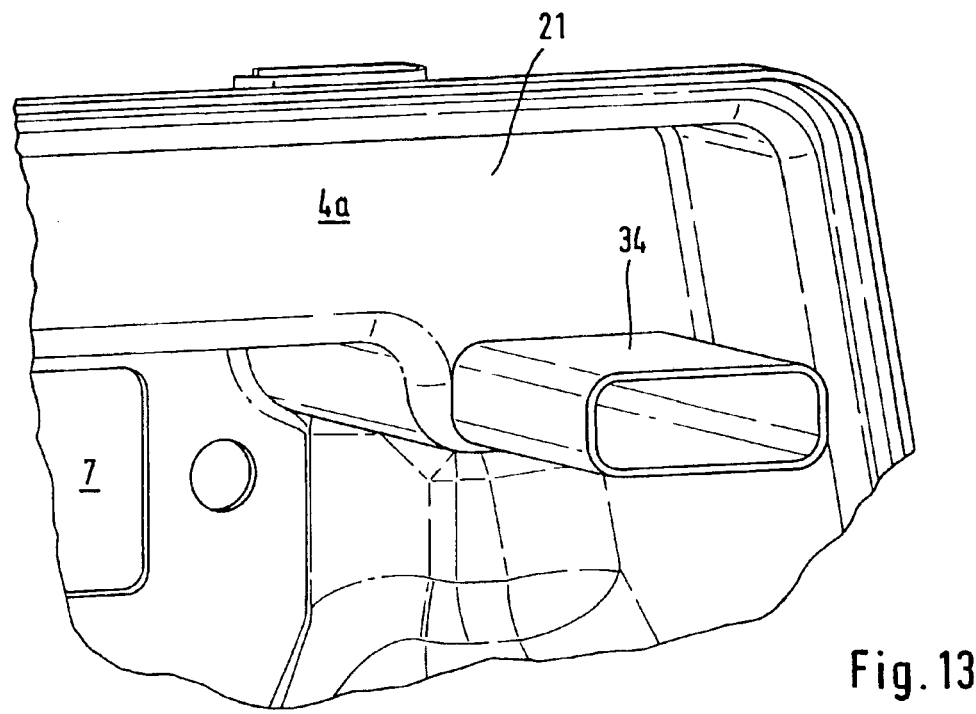
FIG. 13 is a view of the interior of the half shell of the exhaust-gas muffler having the exhaust-gas discharge.

In the embodiment of FIGS. 11 to 13, an outlet channel 34 (FIG. 13), which is connected to the outlet space 10, opens into the air channel 15. The outlet channel is angled at its end 38 and is covered by a protective spark catcher 33. The end 38 and the protective spark catcher 33 are covered by a closure cover 39 (FIG. 11), which simultaneously defines the base 30 of the air channel in the region of the first end 25 of the air channel 15. The closure cover includes two exhaust-gas outlets 12 having respective outlet feeds 13a and 13b assigned thereto. The outlet feeds are configured as U-shaped channels when viewed in section and extend essentially over the entire channel elevation from the base 30 to the cover 16. The feed windows 22, which face toward the second end 35, have essentially a rectangular shape. The outlet feeds 13a and 13b lie at an elevation at a distance $b_5$ next to each other. The outlet feeds 13a and 13b have a distance ($b_3$, $b_4$) to the air channel walls 21. The distances ($b_3$, $b_4$, $b_5$) are preferably equal.

A guide plate 40 is provided on respective ones of the high edges of the feed windows 22. The guide plates 40 extend likewise from the base 30 up to the cover 16. The guide plates 40 are leaned or tilted slightly into the feed windows 22 and ensure that the exhaust-gas component flows, which exit from the feed windows 22, remain separated from each other so that the component of cooling air, which enters between the outlet feeds 13a and 13b, can maintain the separation of the exhaust-gas flows over the extent of the air channel. Each individual exhaust-gas flow is thereby surrounded by the cooling-air component flow so that a good thermal exchange is obtained over the length of the air channel 15 and therefore the temperature at the air channel outlet window 36 can be reduced.

Figure 14:
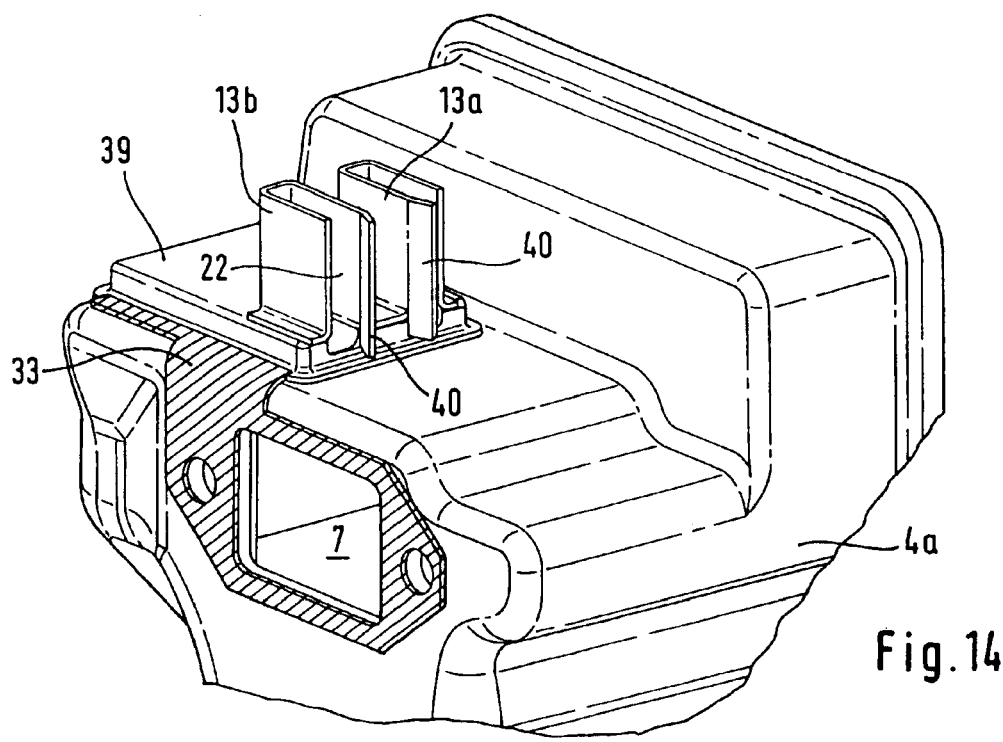
FIG. 14 is a perspective view of a further embodiment of an exhaust-gas muffler having a protective spark screen mounted forward of the discharge feeds.
Figure 15:
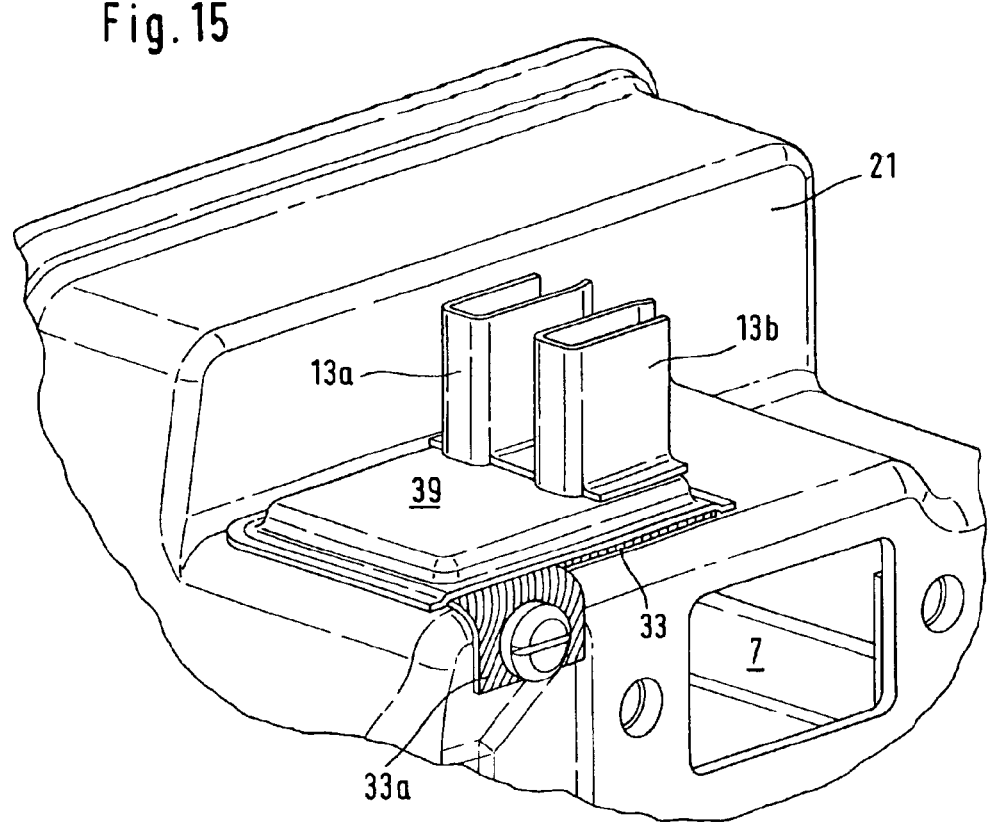
FIG. 15 is a detailed perspective view of an exhaust-gas muffler corresponding to the muffler of FIG. 14 with a protective spark screen which is fixed with a threadably engaged element.
Figure 16:
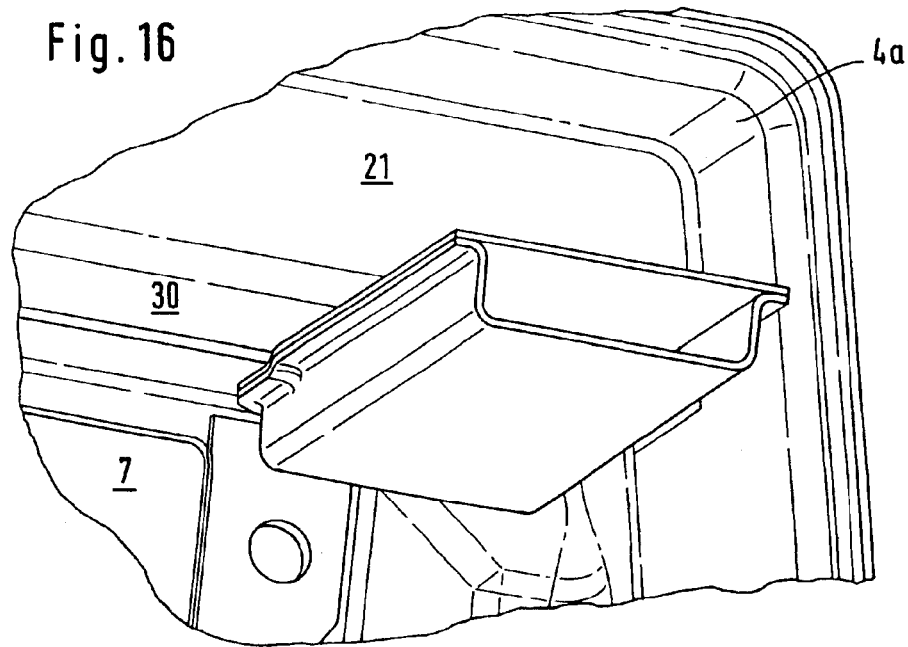
FIG. 16 is a detailed perspective view of the housing shell of the exhaust-gas muffler having the exhaust-gas discharge.
Figure 17:
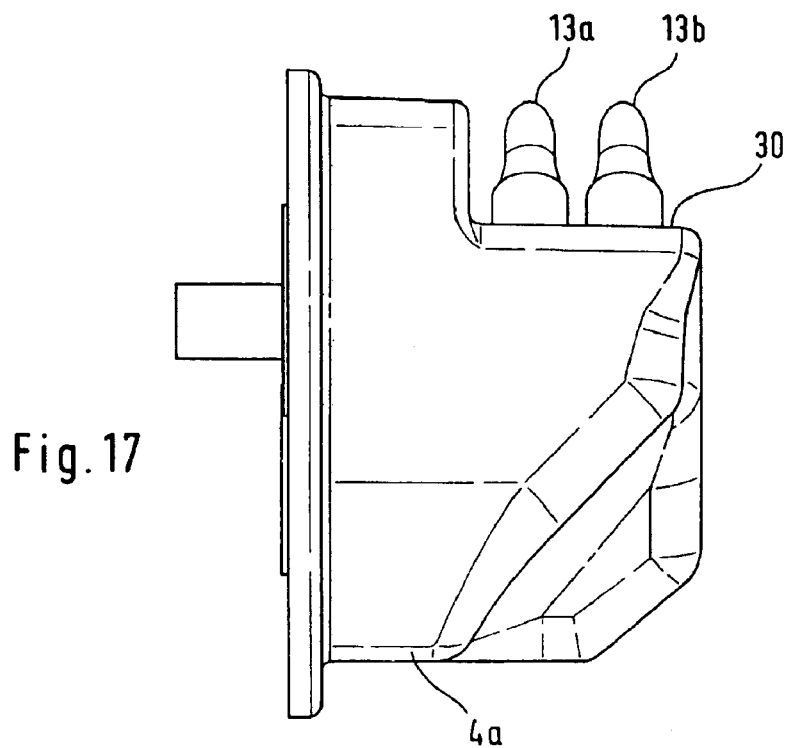
FIG. 17 is a side elevation view of the housing half shell of the exhaust-gas muffler having an exhaust-gas discharge according to the invention.
Figure 18:
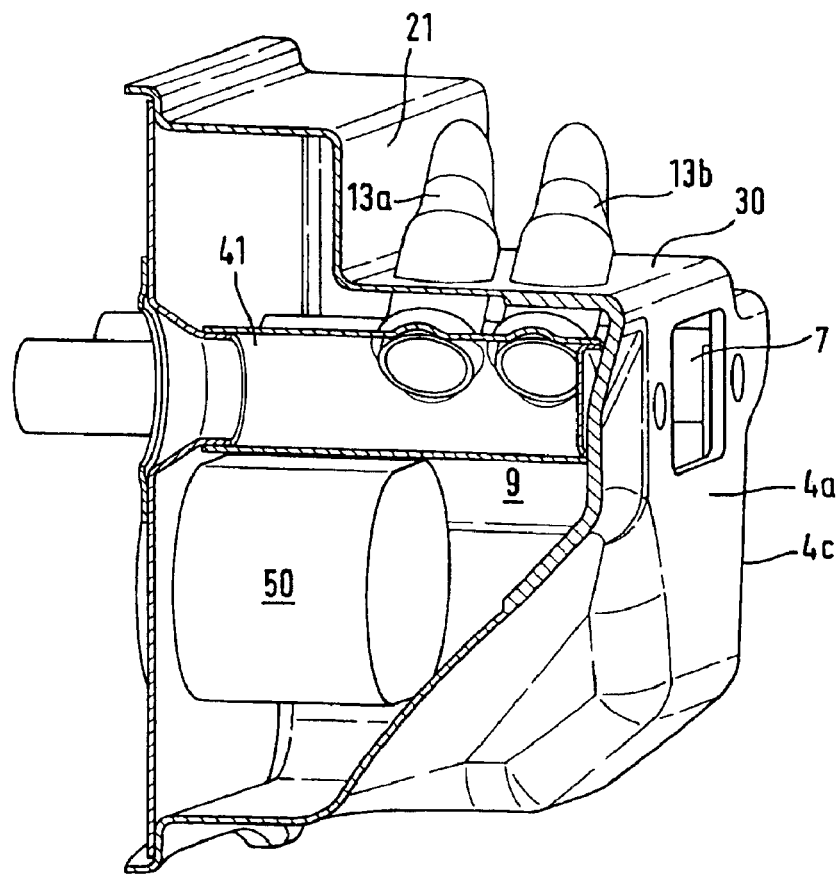
FIG. 18 is a view, partially in section, through the housing half shell of FIG. 17.

In the embodiment of FIGS. 14 to 16, the outlet channel 34 does not enter through the wall 21 of the step 20 of the exhaust-gas muffler into the air channel 15; instead, the outlet channel 34 is guided under the base 30 (FIG. 16). A closure cover 39, which is seated on the base, carries the outlet feeds 13a and 13b, which lie at an elevation next to each other and lie at a lateral spacing $b_5$ next to each other and at distances ($b_3$, $b_4$) to the side walls 21 of the air channel 15. As described in the embodiment of FIGS. 11 and 12, the feed windows 22 include guide plates 40 for guiding and substantially separating the exhaust-gas component flows. In the embodiment of FIG. 14, an L-shaped protective spark catcher 33 is inserted in a slot of the closure cover 39.

The protective spark catcher 33 lies thereby between the exhaust-gas outlet and the feeds 13a and 13b. The other leg of the L-shaped protective spark catcher 33 is fixed between the end wall of the housing half shell 4a and the exhaust-gas stub 3 of the engine 1, whereby the protective spark screen 33 is fixed.

In the embodiment of FIG. 15, the protective spark screen 33 is likewise inserted as an insert into the closure cover 39 so that it lies between the exhaust-gas outlet and the outlet feeds 13a and 13b. A flag 33a of the protective spark screen 33 is fixed by means of an attachment screw on the housing of the exhaust-gas muffler.

Figure 19:
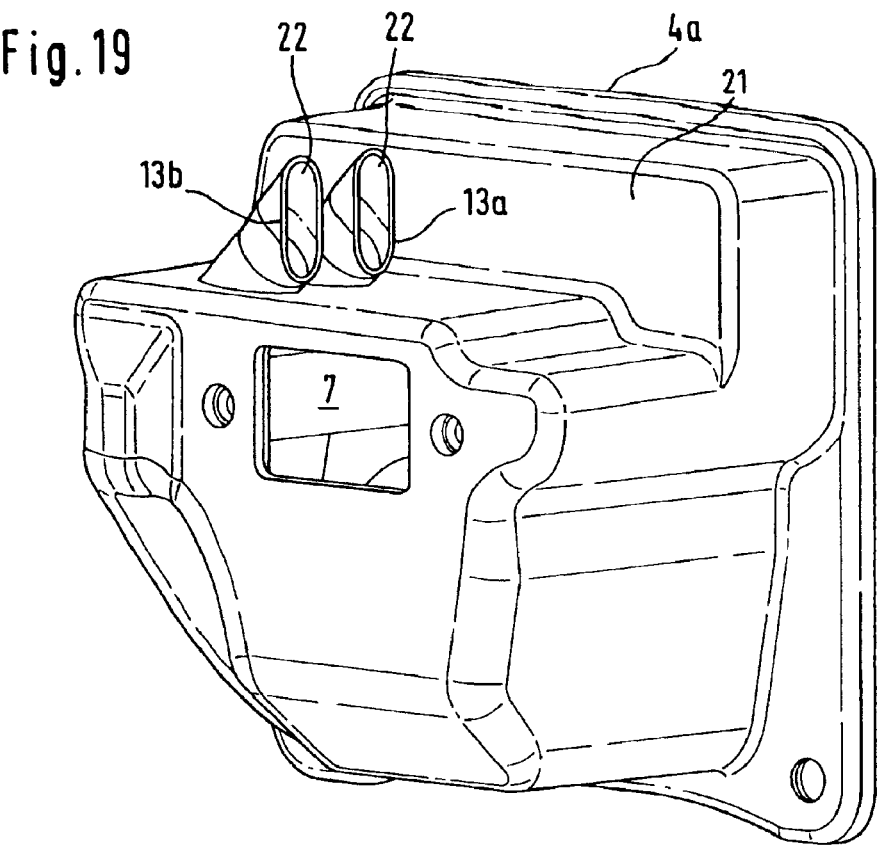
FIG. 19 is a view of the housing half shell of FIG. 17 as seen from the cylinder.
Figure 20:
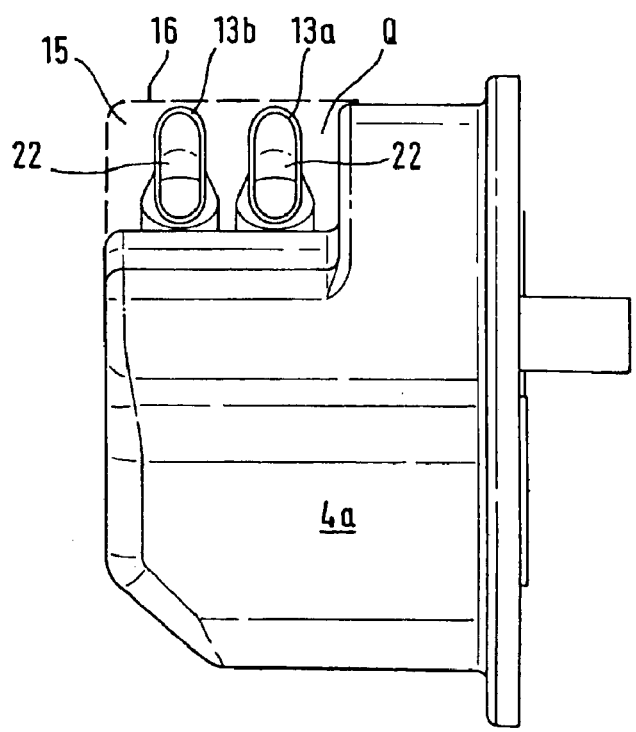
FIG. 20 is a view of the housing half shell and the exhaust-gas discharges.

In the embodiment of FIGS. 17 to 20, an outlet pipe 41 directing exhaust gas away projects through the inlet space 9 (see also FIG. 3). Two pipe-shaped outlet feeds (13a, 13b) lead from the outlet pipe 41 through the base 30 of the air channel 15 into the air channel. As shown in FIG. 19, the ends of the pipe-shaped outlet feeds are oval and have approximately rectangular-oval feed windows 22. As shown in FIGS. 19 and 20, the lower edges of the feed windows 22 lie above the base 30 so that the cooling-air flow can flow essentially completely around the feed window 22. A distance can be provided to the cover 16 as shown in FIG. 20 in phantom outline.

Figure 21:
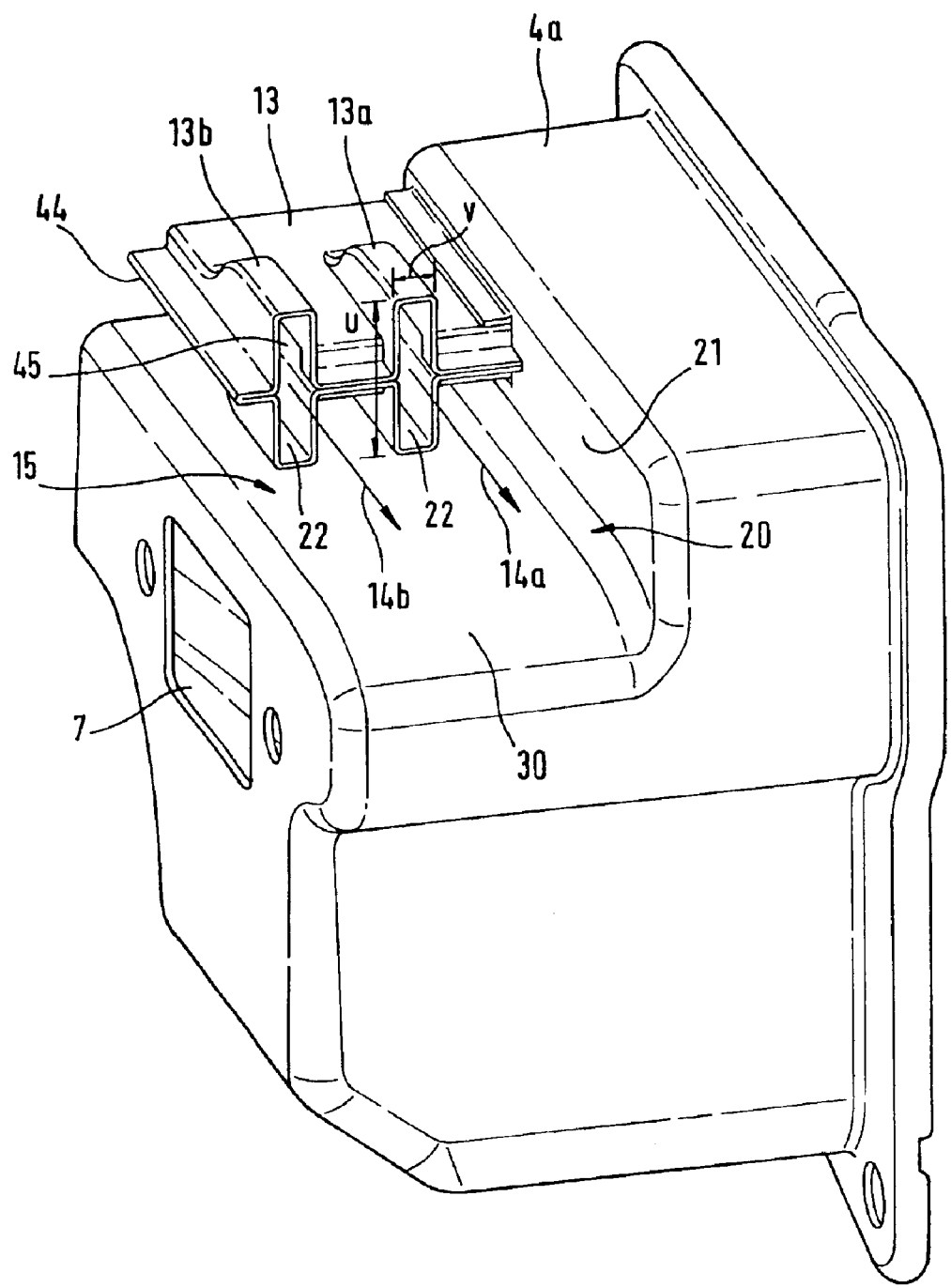
FIG. 21 is a view of a half shell of an exhaust-gas muffler having a discharge feed provided in the side wall of the air channel.

In FIG. 21, the housing half shell 4a of the exhaust-gas muffler is shown with an exhaust-gas inlet 7. As in the previous embodiments, the same reference numerals are used for the same parts.

A sheet metal part is used to form the outlet feed 13 and is configured as a single piece. This sheet metal part is bent over at 180° at the fold line 44 to form the outlet feeds 13a and 13b. Each outlet feed 13a and 13b comprises an upper part and a lower part, which are brought into contact engagement with each other by bending over at the fold line 44. Here, at the same time, an exhaust-gas channel is formed in the outlet feed 13, which is inserted into the housing side wall 21 of the step 20 of the exhaust-gas muffler. In this way, an outlet feed 13 of two individual feeds 13a and 13b is mounted with simple means and simple formed parts on the exhaust-gas outlet. The feeds 13a and 13b lie next to each other transversely to the air channel 15 and introduce respective exhaust-gas component flows 14a and 14b into the air channel 15.

The feed windows 22 have essentially a rectangularly-shaped configuration with a width (v) and a height (u). A feed window of this kind is shown enlarged in FIG. 22. As shown in FIG. 22, the feed window 22 has an area A=vu as well as a periphery U=2u+2v.

To obtain a significant temperature reduction, the constructive design of the air channel and the feed windows is advantageously so designed that the hydraulic diameter $$d = \frac{4A}{U}$$

is less than 6.5 mm and is preferably approximately 5 mm. Good results are obtained with an internal combustion engine having a piston displacement of 70 cm³. Piston displacements departing from the above can also be provided without significant change in the hydraulic diameter.

The outlet area of the exhaust-gas flow, which is conducted away via the scoop channel 45 into the air channel 15, has, advantageously, a total area which is determined approximately by the ratio 1.3 mm² per 1 cm³ piston displacement. In a design of this kind, an exhaust-gas counterpressure in the exhaust-gas muffler is obtained which is advantageous for the operation of the two-stroke engine. The total outlet area Z is advantageously subdivided into several outlet windows, that is, into several feed windows 22. Preferably, one to six feed windows are provided. In the embodiment, two feed windows are provided, with which a good effect is achieved. Advantageously, the number of feed windows can be also three.

The cross section Q (FIG. 20) of the air channel 15 in the outlet plane of the feed windows 22 is approximately 2 to 6 times larger than the total outlet area of the sum of all feed windows 22. Preferably, the cross section Q of the air channel 15 in the outlet plane of the feed windows 22 is approximately 4 to 20 times larger than the outlet area A of an individual feed window 22. Suitably, the cross section is 10 to 15 times of one feed window 22. All feed windows 22 preferably have the same area A.

The configuration of the air channel 15 is so provided that it is expanded in cross section toward its channel outlet window 36. The channel outlet window 36 is especially approximately 1.5 to 4 times larger than the channel inlet window 26 in the region of the cooling-air blower 5. The length of the air channel 15 between its channel inlet window 26 and the channel outlet window 36 is so dimensioned that the length is greater than five times the hydraulic diameter (d) of one feed window 22. Preferably, the length of the channel is approximately 8 to 12 times the hydraulic diameter (d). The effective cross section of a feed window is selected to be as large as possible; that is, the wall thicknesses of the outlet feeds are configured as thin as possible.

As shown in FIG. 23, the channel outlet window 36 is so configured that it opens at an angle to the ambient. The outer edge 47 of the cover 16, which forms the air channel 15, lies at a distance (z) to the inner edge 48 of the exhaust-gas muffler 4. In this way, the protective spark catcher 33, which is mounted in the outlet plane of the channel outlet window 36, lies at an angle to the longitudinal axis 46 of the exhaust-gas stub 3. The angle lies in a range of 30 to 60°.

FIG. 24 schematically illustrates an alternate arrangement of the air channel 15. The same parts have the same reference numerals. The exhaust-gas muffler 4 is connected to the exhaust-gas discharge 3 of the cylinder 2 of the internal combustion engine 1. The cooling-air blower lies laterally next to the cylinder 2 and is driven by the crankshaft 6. The air channel 15 lies approximately in the plane of the blower wheel and extends laterally next to the exhaust-gas muffler 4 from the cooling-air blower 5 to behind the side of the exhaust-gas muffler 4, which faces away from the cylinder 2. The channel outlet window 36 leads the exhaust-gas flow transversely to the longitudinal center axis 46 of the engine 1, which runs through the exhaust-gas stub 3.

Figure 25:
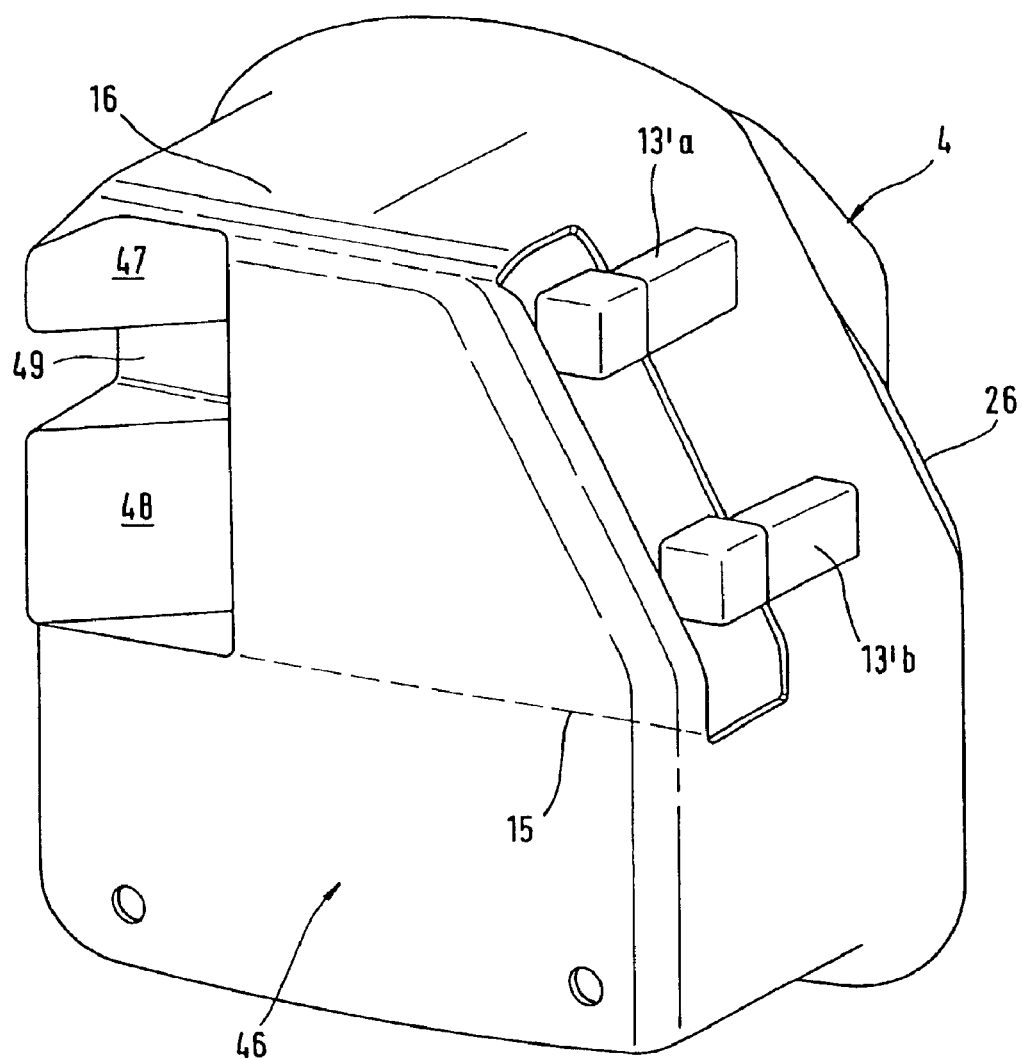

In FIG. 25, a muffler 4 is shown, whose cover 16 is configured as a protective shell 46, which essentially engages over a housing half of the muffler 4. The outlet feeds (13'a, 13'b) extend beyond the contour of the muffler 4 in order to obtain a long flow path in the air channel 15. The protective shell 16 delimits the air channel 15 having an inlet window 26 through which cooling air flows in in order to cool the exhaust gas flowing from the feeds (13'a, 13'b) into the air channel 15. Ramps (47, 48) are provided at different elevations in the outlet window 36 for conducting the exiting flow. The ramps (47, 48) are separated from each other by a gap 49. The upper ramp 47 is assigned to the feed 13'a and lies at the elevation thereof. The lower ramp 48 lies in the base region of the air channel 15 and is assigned to the feed 13'b and lies at the elevation thereof. The ramps (47, 48) can have different pitch angles for deflecting the flows. A component flow preferably flows out undirected through the gap 49.

It is understood that the foregoing description is that of the preferred embodiments of the invention and that various changes and modifications may be made thereto without departing from the spirit and scope of the invention as defined in the appended claims.

What is claimed is:

1. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including a muffler housing partitioned into an inlet space and an outlet space;

said muffler further including an exhaust-gas inlet opening into said inlet space and connected to said exhaust-gas stub adjacent said cylinder;

said muffler further including an exhaust-gas outlet for conducting exhaust gas out of said outlet space;

an outer cover mounted on said muffler housing and said outer cover and said muffler housing conjointly delimiting an air channel extending along a side of said muffler;

said air channel having a first end for receiving a component of said cooling air flow generated by said cooling air blower independently of a flow of said exhaust gas and having a second end where the cooling air flow component exits;

feed means for conducting a jet of said exhaust gas from said exhaust-gas outlet into said air channel so as to cause said jet of exhaust gas to flow at a spaced relationship to all sidewalls of said air channel and be surrounded by said cooling air flow component in such a manner that said jet is a core flow and said cooling air flow component is a jacket flow surrounding said core flow; and, said feed means including a plurality of exhaust-gas outlets for conducting exhaust gas into said air channel.

2. The muffler arrangement of claim 1, further comprising a catalytic converter disposed between said inlet space and said outlet space for treating said exhaust gases as they pass from said inlet space to said outlet space.

3. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including: a muffler housing partitioned into an inlet space and an outlet space; an exhaust-gas inlet opening into said inlet space and connected to said exhaust-gas stub adjacent said cylinder; and, an exhaust-gas outlet for conducting exhaust gas out of said outlet space;

an outer cover mounted on said muffler housing and said outer cover and said muffler housing conjointly delimiting an air channel extending along a side of said muffler;

said air channel including: a first end for receiving a component of said cooling air flow generated by said cooling air blower independently of a flow of said exhaust gas: and, a second end where the cooling air flow component exits;

feed means for conducting a plurality of jets of said exhaust gas from said exhaust-gas outlet into said air channel so as to cause each of said jets of exhaust gas to flow at a spaced relationship to all sidewalls of said air channel and be surrounded by said cooling air flow component in such a manner that each of said jets is a core flow and said cooling air flow component is a plurality of jacket flows surrounding corresponding ones of the core flows;

said air channel defining a longitudinal axis and said cooling air flow component flowing in a flow direction;

said feed means including a plurality of outlet feeds; and, said outlet feeds being arranged on said exhaust-gas outlet and projecting into said air channel so as to cause said each of said jets to have a flow direction corresponding to said flow direction of said cooling air flow component and to be aligned in said longitudinal direction.

4. The muffler arrangement of claim 3, wherein said outlet feed extends essentially over the elevation of said air channel; and, said outlet feed has an outlet feed window having a rectangular shape.

5. The muffler arrangement of claim 4, wherein at least one of said exhaust-gas outlet and said outlet feed window lies close to said first end of said air channel.

6. The muffler arrangement of claim 5, further comprising a spark protective screen mounted transversely to the flow of said exhaust gas; and, said spark protective screen being mounted forward of at least one of said exhaust-gas outlet and said outlet feed.

7. The muffler arrangement of claim 3, wherein said air channel is mounted laterally next to said muffler so as to extend approximately parallel to said exhaust-gas stub.

8. The muffler arrangement of claim 3, wherein said first and second ends of said air channel extend over the contour of the housing of said muffler.

9. The muffler arrangement of claim 3, wherein said first end of said air channel lies close to said cooling air blower and projects into said cooling air flow.

10. The muffler arrangement of claim 3, wherein said muffler housing includes a step and said cover extends over said step to define said air channel therewith.

11. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including: a muffler housing partitioned into an inlet space and an outlet space; an exhaust-gas inlet opening into said inlet space and connected to said exhaust-gas stub adjacent said cylinder; and, an exhaust-gas outlet for conducting exhaust gas out of said outlet space;

an outer cover mounted on said muffler housing and said outer cover and said muffler housing conjointly delimiting an air channel extending along a side of said muffler;

said air channel including: a first end for receiving a component of said cooling air flow generated by said cooling air blower independently of a flow of said exhaust gas; and, a second end where the cooling air flow component exits;

feed means for conducting a jet plurality of jets of said exhaust gas from said exhaust-gas outlet into said air channel so as to cause each of said jets of exhaust gas to flow at a spaced relationship to all sidewalls of said air channel and be surrounded by said cooling air flow component in such a manner that each of said jets is a core flow and said cooling air flow component is a plurality of jacket flows surrounding corresponding ones of the core flows;

said air channel defining a longitudinal axis and said cooling air flow component flowing in a flow direction;

said feed means including a plurality of outlet feeds;

said outlet feeds being arranged on said exhaust-gas outlet and projecting into said air channel so as to cause each of said jets to have a flow direction corresponding to said flow direction of said cooling air flow component and to be aligned in said longitudinal direction;

said outlet feeds extending over the elevation of said air channel; and, said outlet feeds having an outlet feed window having essentially a rectangular shape; and, said outlet feed window having a hydraulic diameter (d) less than 6.5 mm; and, wherein said hydraulic diameter (d) is determined from the formula d=4A/U wherein:
A is the area; and,
U is the periphery of said outlet feed window.

12. The muffler arrangement of claim 11, wherein said hydraulic diameter (d) is less than 5 mm.

13. The muffler arrangement of claim 11, wherein said feed means comprises a plurality of said outlet feeds having respective outlet feed windows and the total discharge area (Z) of all of said outlet feeds lies in a ratio to the stroke volume of 1.3 mm$^2$/1cm$^3$; and, said total discharge area (Z) is distributed over one to six of said outlet feed windows.

14. The muffler arrangement of claim 13, wherein said total discharge area (Z) is distributed over two to three of said outlet feed windows.

15. The muffler arrangement of claim 13, wherein the cross section of said air channel in the plane of the outlet feed windows is a multiple greater than the total discharge area (Z) of said outlet feed windows.

16. The muffler arrangement of claim 15, wherein said cross section is two to six times greater than said total discharge area (Z).

17. The muffler arrangement of claim 15, wherein the cross section of said air channel in the plane of the outlet feed windows is approximately four to twenty times the outlet area (A) of one of said outlet feed windows.

18. The muffler arrangement of claim 17, wherein the cross section of said air channel in the plane of the outlet feed windows is approximately ten to fifteen times greater than the outlet area (A) of one of said outlet feed windows.

19. The muffler arrangement of claim 11, wherein said air channel is mounted laterally next to said muffler so as to extend approximately parallel to said exhaust-gas stub.

20. The muffler arrangement of claim 11, wherein said first and second ends of said air channel extend over the contour of the housing of said muffler.

21. The muffler arrangement of claim 11, wherein said first end of said air channel lies close to said cooling air blower and projects into said cooling air flow.

22. The muffler arrangement of claim 11, wherein said muffler housing includes a step and said cover extends over said step to define said air channel therewith.

23. The muffler arrangement of claim 11, further comprising a catalytic converter disposed between said inlet space and said outlet space for treating said exhaust gases as they pass from said inlet space to said outlet space.

24. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including: a muffler housing partitioned into an inlet space and an outlet space; an exhaust-gas inlet opening into said inlet space and connected to said exhaust-gas stub adjacent said cylinder; and, an exhaust-gas outlet for conducting exhaust gas out of said outlet space;

an outer cover mounted on said muffler housing and said outer cover and said muffler housing conjointly delimiting an air channel extending along a side of said muffler;

said air channel including: a first end for receiving a component of said cooling air flow generated by said cooling air blower independently of a flow of said exhaust gas; and, a second end where the cooling air flow component exits;

feed means for conducting a plurality of jets of said exhaust gas from said exhaust-gas outlet into said air channel so as to cause each of said jets of exhaust gas to flow at a spaced relationship to all sidewalls of said air channel and be surrounded by said cooling air flow component in such a manner that each of said jets is a core flow and said cooling air flow component is a plurality of jacket flows surrounding corresponding ones of the core flows;

said air channel defining a longitudinal axis and said cooling air flow component flowing in a flow direction;

said feed means including a plurality of outlet feeds; and, said outlet feeds being arranged on said exhaust-gas outlet and projecting into said air channel so as to cause each of said jets to have a flow direction corresponding to said flow direction of said cooling air flow component and to be aligned in said longitudinal direction;

said air channel having an outlet window at said second end thereof; and, said air channel being widened toward said outlet window thereof.

25. The muffler arrangement of claim 24, wherein said air channel has an inlet window at said first end thereof; and, said outlet window has an area which is approximately 1.5 to 4 times the area of said inlet window.

26. The muffler arrangement of claim 24, wherein said outlet feed window has a hydraulic diameter (d); and, wherein the length of said air channel between said inlet window and said outlet window thereof is greater than five times said hydraulic diameter (d).

27. The muffler arrangement of claim 26, wherein the length of said air channel between said inlet window and said outlet window thereof is greater than eight to twelve times said hydraulic diameter (d).

28. The muffler arrangement of claim 24, wherein said air channel is mounted laterally next to said muffler so as to extend approximately parallel to said exhaust-gas stub.

29. The muffler arrangement of claim 24, wherein said first and second ends of said air channel extend over the contour of the housing of said muffler.

30. The muffler arrangement of claim 24, wherein said first end of said air channel lies close to said cooling air blower and projects into said cooling air flow.

31. The muffler arrangement of claim 24, wherein said muffler housing includes a step and said cover extends over said step to define said air channel therewith.

32. The muffler arrangement of claim 24, further comprising a catalytic converter disposed between said inlet space and said outlet space for treating said exhaust gases as they pass from said inlet space to said outlet space.

33. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including a muffler housing partitioned into an inlet space and an outlet space;

said muffler further including an exhaust-gas inlet opening into said inlet space and connected to said exhaust-gas stub adjacent said cylinder;

said muffler further including an exhaust-gas outlet for conducting exhaust gas out of said outlet space;

an outer cover mounted on said muffler housing and said outer cover and said muffler housing conjointly delimiting an air channel extending along a side of said muffler;

said air channel having a first end for receiving a component of said cooling air flow and having a second end where the cooling air flow component exits;

feed means for conducting a jet of said exhaust gas from said exhaust-gas outlet into said air channel so as to cause said jet of exhaust gas to flow at a spaced relationship to all sidewalls of said air channel and be surrounded by said cooling air flow component in such a manner that said jet is a core flow and said cooling air flow component is essentially a jacket flow surrounding said core flow;

said air channel defining a longitudinal axis and said cooling air flow component flowing in a flow direction;

said feed means comprising an outlet feed arranged on said exhaust-gas outlet and projecting into said air channel so as to cause said jet to have a flow direction corresponding to said flow direction of said cooling air flow component and to be aligned in said longitudinal direction;

said feed means including a plurality of said outlet feeds disposed at a spacing (b) one next to the other transversely to the longitudinal direction of said air channel;

said outlet feeds having respective outlet feed windows defining respective window edges; each of said edges having a guide plate mounted thereon; and, each two mutually adjacent ones of said guide plates defining an entry gap therebetween for the cooling air of said cooling air flow component.

34. The muffler arrangement of claim 33, wherein the plurality of exhaust-gas jets passing out of said respective outlet feed windows enter said air channel at different planes.

35. The muffler arrangement of claim 34, wherein said plurality of exhaust-gas jets spatially cross each other.

36. The muffler arrangement of claim 33, wherein said air channel is mounted laterally next to said muffler so as to extend approximately parallel to said exhaust-gas stub.

37. The muffler arrangement of claim 33, wherein said first and second ends of said air channel extend over the contour of the housing of said muffler.

38. The muffler arrangement of claim 33, wherein said first end of said air channel lies close to said cooling air blower and projects into said cooling air flow.

39. The muffler arrangement of claim 33, wherein said muffler housing includes a step and said cover extends over said step to define said air channel therewith.

40. The muffler arrangement of claim 33, further comprising a catalytic converter disposed between said inlet space and said outlet space for treating said exhaust gases as they pass from said inlet space to said outlet space.

41. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including: a muffler housing partitioned into an inlet space and an outlet space; an exhaust-gas inlet opening into said inlet space and connected to said exhaust-gas stub adjacent said cylinder; and, an exhaust-gas outlet for conducting exhaust gas out of said outlet space;

an outer cover mounted on said muffler housing and said outer cover and said muffler housing conjointly delimiting an air channel extending along a side of said muffler;

said air channel including: a first end for receiving a component of said cooling air flow generated by said cooling air blower independently of a flow of said exhaust gas; and, a second end where the cooling air flow component exits;

feed means for conducting a plurality of jets of said exhaust gas from said exhaust-gas outlet into said air channel so as to cause each of said jets of exhaust gas to flow at a spaced relationship to all sidewalls of said air channel and be surrounded by said cooling air flow component in such a manner that said jet is a core flow and said cooling air flow component is a plurality of jacket flows surrounding corresponding ones of the core flows;

said air channel defining a longitudinal axis and said cooling air flow component flowing in a flow direction;

said feed means including a plurality of outlet feeds; and, said outlet feeds being arranged on said exhaust-gas outlet and projecting into said air channel so as to cause each of said jets to have a flow direction corresponding to said flow direction of said cooling air flow component and to be aligned in said longitudinal direction; and, a plurality of intake scoops conducting air into said cover.

42. The muffler arrangement of claim 41, wherein said air channel is mounted laterally next to said muffler so as to extend approximately parallel to said exhaust-gas stub.

43. The muffler arrangement of claim 41, wherein said first and second ends of said air channel extend over the contour of the housing of said muffler.

44. The muffler arrangement of claim 41, wherein said first end of said air channel lies close to said cooling air blower and projects into said cooling air flow.

45. The muffler arrangement of claim 41, wherein said muffler housing includes a step and said cover extends over said step to define maid air channel therewith.

46. The muffler arrangement of claim 41, further comprising a catalytic converter disposed between said inlet space and said outlet space for treating said exhaust gases as they pass from said inlet space to said outlet space.

47. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including a muffler housing partitioned into an inlet space and an outlet space;

said muffler further including an exhaust-gas inlet opening into said inlet space and connected to said exhaust-gas stub adjacent said cylinder;

said muffler further including an exhaust-gas outlet for conducting exhaust gas out of said outlet space;

an outer cover mounted on said muffler housing and said outer cover and said muffler housing conjointly delimiting an air channel extending along a side of said muffler;

said air channel having a first end for receiving a component of said cooling air flow and having a second end where the cooling air flow component exits;

feed means for conducting a jet of said exhaust gas from said exhaust-gas outlet into said air channel so as to cause said jet of exhaust gas to flow at a spaced relationship to all sidewalls of said air channel and be surrounded by said cooling air flow component in such a manner that said jet is a core flow and said cooling air flow component is essentially a jacket flow surrounding said core flow;

said air channel defining a longitudinal axis and said cooling air flow component flowing in a flow direction;

said feed means including an outlet feed arranged on said exhaust-gas outlet and projecting into said air channel so as to cause said jet to have a flow direction corresponding to said flow direction of said cooling air flow component and to be aligned in said longitudinal direction; and, said air channel being mounted between said cylinder and said muffler so as to be approximately transverse to said exhaust-gas stub of said cylinder.

48. The muffler arrangement of claim 47, wherein said air channel is mounted laterally next to said muffler so as to extend approximately parallel to said exhaust-gas stub.

49. The muffler arrangement of claim 47, wherein said first and second ends of said air channel extend over the contour of the housing of said muffler.

50. The muffler arrangement of claim 47, wherein said first end of said air channel lies close to said cooling air blower and projects into said cooling air flow.

51. The muffler arrangement of claim 47, wherein said muffler housing includes a step and said cover extends over said step to define said air channel therewith.

52. The muffler arrangement of claim 47, further comprising a catalytic converter disposed between said inlet space and said outlet space for treating said exhaust gases as they pass from said inlet space to said outlet space.

53. A muffler arrangement for an internal combustion engine of a portable handheld work apparatus, the muffler arrangement comprising:

said engine including a cylinder having an exhaust-gas stub through which exhaust gas is discharged during operation of the engine;

said engine further including a cooling air blower for generating a cooling air flow;

a muffler including: a muffler housing partitioned into an inlet space and an outlet space; an exhaust-gas inlet opening into said inlet space and connected to said exhaust-gas stub adjacent said cylinder; and, an exhaust-gas outlet for conducting exhaust gas out of said outlet space;

an outer cover mounted on said muffler housing and said outer cover and said muffler housing conjointly delimiting an air channel extending along a side of said muffler;

said air channel including: a first end for receiving a component of said cooling air flow generated by said cooling air blower independently of a flow of said exhaust gas; and a second end where the cooling air flow component exits;

feed means for conducting a plurality of jets of said exhaust gas from said exhaust-gas outlet into said air channel so as to cause each of said jets of exhaust gas to flow at a spaced relationship to all sidewalls of said air channel and be surrounded by said cooling air flow component in such a manner that each of said jets is a core flow and said cooling air flow component is a plurality of jacket flows surrounding corresponding ones of the core flows;

said air channel defining a longitudinal axis and said cooling air flow component flowing in a flow direction;

said feed means including a plurality of outlet feeds;

said outlet feeds being arranged on said exhaust-gas outlet and projecting into said air channel so as to cause each of said jets to have a flow direction corresponding to said flow direction of said cooling air flow component and to be aligned in said longitudinal direction; and, the ends of said outlet feeds extending over the contour of the housing of said muffler.

54. The muffler arrangement of claim 53, wherein said air channel is mounted laterally next to said muffler so as to extend approximately parallel to said exhaust-gas stub.

55. The muffler arrangement of claim 53, wherein said first and second ends of said air channel extend over the contour of the housing of said muffler.

56. The muffler arrangement of claim 53, wherein said first end of said air channel lies close to said cooling air blower and projects into said cooling air flow.

57. The muffler arrangement of claim 53, wherein said muffler housing includes a step and said cover extends over said step to define said air channel therewith.

58. The muffler arrangement of claim 53, further comprising a catalytic converter disposed between said inlet space and said outlet space for treating said exhaust gases as they pass from said inlet space to said outlet space.

* * * * *